US012338985B1

(12) United States Patent
Loomis

(10) Patent No.: US 12,338,985 B1
(45) Date of Patent: Jun. 24, 2025

(54) LIGHTING ELEMENT ADAPTOR

(71) Applicant: Seasons 4, Inc., Toano, VA (US)

(72) Inventor: Jason Loomis, Decatur, GA (US)

(73) Assignee: SEASONS 4, INC., Toano, VA (US)

( * ) Notice: Subject to any disclaimer, the term of this patent is extended or adjusted under 35 U.S.C. 154(b) by 0 days.

(21) Appl. No.: 18/779,685

(22) Filed: Jul. 22, 2024

(51) Int. Cl.

| | |
|---|---|
| ***F21V 23/06*** | (2006.01) |
| ***F21V 19/00*** | (2006.01) |
| ***F21V 23/00*** | (2015.01) |
| ***F21V 23/04*** | (2006.01) |
| ***F21V 33/00*** | (2006.01) |

(52) U.S. Cl.
CPC ............ *F21V 23/06* (2013.01); *F21V 19/006* (2013.01); *F21V 23/003* (2013.01); *F21V 23/0435* (2013.01); *F21V 33/0056* (2013.01)

(58) Field of Classification Search
CPC .......................... F21V 19/006; H01R 33/9453
See application file for complete search history.

(56) References Cited

U.S. PATENT DOCUMENTS

| | | | | |
|---|---|---|---|---|
| 8,042,961 | B2 | 10/2011 | Massara et al. | |
| 8,872,417 | B2 | 10/2014 | Fatt et al. | |
| 9,265,119 | B2 | 2/2016 | Catalano et al. | |
| 10,264,170 | B2 | 4/2019 | Chien | |
| 2007/0110266 | A1* | 5/2007 | Zulkowski | F21V 33/0056 381/334 |
| 2009/0260504 | A1 | 10/2009 | Chen | |
| 2010/0330843 | A1* | 12/2010 | Gao | H01R 31/065 439/620.21 |
| 2012/0120243 | A1* | 5/2012 | Chien | H04N 23/51 348/143 |
| 2013/0308315 | A1 | 11/2013 | Capitani et al. | |
| 2014/0268697 | A1* | 9/2014 | Smith | F21K 9/232 362/183 |
| 2014/0285999 | A1 | 9/2014 | Luna et al. | |
| 2015/0109784 | A1* | 4/2015 | Baschnagel | H01R 33/9453 362/253 |
| 2016/0215933 | A1* | 7/2016 | Skelton | H01R 31/02 |
| 2023/0086995 | A1 | 3/2023 | Zhang et al. | |

* cited by examiner

*Primary Examiner* — Alexander K Garlen
(74) *Attorney, Agent, or Firm* — Kinney & Lange, P.A.

(57) ABSTRACT

Apparatus and associated methods relate lighting element adaptor that has a male and a female connector axially aligned with one another so as to be interposed between a lighting element and a lighting socket. The male connector is configured to engage the lighting socket so as to receive AC power provided therefrom. The female connector is complementary to the male connector. The female connector is conductively coupled with the male connector so as to receive AC power therefrom. The female connector is configured to receive the lighting element and to provide the AC power received from the male connector thereto. The lighting element adaptor is configured to generate DC power from the AC power received by the threaded male E-Socket. The lighting element adapter is configured to provide the DC power generated to a DC-powered device connected thereto.

19 Claims, 6 Drawing Sheets

LIGHTING ELEMENT ADAPTOR

BACKGROUND

Various venues where people gather provide music for ambiance so as to attract patrons and guests thereto. For example, various outdoor venues can be used for dining, for listening to invited speakers, for concerts, etc. Many such venues will provide lighting for guests attending such events. Some such outdoor lighting systems can be permanently constructed, or temporarily constructed. One such form of outdoor lighting uses Café lighting strings. Café light strings are strings of lights configured to provide lighting over an open expanse, such as, for example, a grassy lawn or a patio. These café lights are usually configured as strings of lights suspended over the open expanse between securing structures.

SUMMARY

Some embodiments relate to a lighting element adaptor that includes complementary male and female AC-power connectors axially aligned with one another. Such a configuration permits the lighting element adaptor to be interposed between a lighting element and a lighting socket. The male AC-power connector is configured to engage a lighting socket so as to receive AC power therefrom. The female AC-power connector is conductively coupled with the male AC-power connector so as to receive AC power therefrom. The female AC-power connector is configured to receive a lighting element and to provide the AC power received from the male AC-power connector thereto. The lighting element adaptor also includes am AC/DC power converter configured to generate DC power from the AC power received by the male AC-power connector and to provide the DC power generated to a DC-powered device coupled thereto.

Some embodiments relate to a lamp fixture having an AC-power connector configured to engage an AC outlet so as to receive AC power provided therefrom. The lamp fixture includes an AC/DC power converter configured to generate DC power from the AC power received by the AC-power connector. The lamp fixture includes a DC-power connector configured to provide the DC power generated by the AC/DC converter to an illuminating lamp shade. The lamp fixture includes an illuminating lamp shade having a plurality of LEDs that are configured to generate an illumination pattern thereon in response to DC power provided thereto via the DC-power connector. The lamp fixture also includes a lighting-element connector conductively coupled with the AC-power connector so as to receive AC power therefrom, the lighting-element connector configured to receive a lighting element and to provide the AC power received from the AC-power connector thereto.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Apparatus and associated methods relate lighting element adaptor that has a male and a female connector axially aligned with one another so as to be interposed between a lighting element and a lighting socket. The male connector is configured to engage the lighting socket so as to receive AC power provided therefrom. The female connector is complementary to the male connector. The female connector is conductively coupled with the male connector so as to receive AC power therefrom. The female connector is configured to receive the lighting element and to provide the AC power received from the male connector thereto. The lighting element adaptor is configured to generate DC power from the AC power received by the threaded male E-Socket. The lighting element adapter is configured to provide the DC power generated to a DC-powered device connected thereto.

Figure 1:
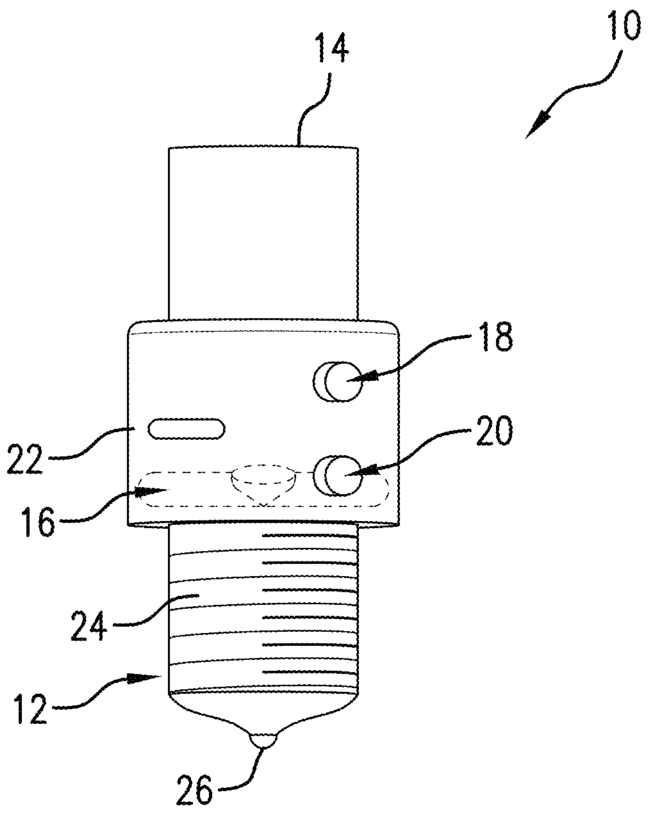
FIG. 1 is a side elevation view of a light element adaptor.

FIG. 1 is a side elevation view of a light element adaptor. In FIG. 1, light element adaptor 10 has male AC-power connector 12, female AC-power connector 14, AC/DC power converter 16, AC power switch 18, DC power switch 20 and DC-power connector 22, which in the depicted embodiment is a USB-C type of power connector. Various other industry standard low-voltage connectors could be used for providing DC-power to connected devices. Such other low-voltage connectors include, for example, USB-A, USB-B, USB-C, Micro-USB, Mini-USB, Lightning Connectors (e.g., proprietary connectors used by Apple™ for iPhones™, iPads™, and other Apple™ devices), Barrel Connectors (i.e., round connectors commonly used for DC power input on laptops and other devices), etc.

In the depicted embodiment, male and female AC-power connectors 12 and 14 are complementary to one another. Such complementarity of male and female AC-power connectors enables light element adaptor 10 to be interposed between a lighting element and a lighting socket configured to receive the lighting element. For example, the lighting element can be removed from the lighting socket by removing a male AC-power connector of the lighting element from the lighting socket. Male AC-power connector 12 of lighting element adaptor 10, being made according to the same standard as the male AC-power connector of the lighting element, can then be inserted into the lighting socket. Female AC-power connector 14 of lighting element adaptor 10, being made according to the same standard as the female AC-power connector of the lighting socket, can then receive the male AC-power connector of the lighting element therein.

Male and female AC-power connectors 12 and 14 are conductively coupled to one another, such that female AC-power connector 14 provides AC power received by male AC-power connector 12 to the lighting element. In the depicted embodiment, AC power is selectively provided to female AC-power connector 14 via AC-power switch 18. In other embodiments, female AC-power connector 14 and male AC-power connector 12 are hardwire connected to one another. Thus, the lighting element is provided AC power regardless of whether the lighting element is directly connected or indirectly connected, via light element adaptor 10, to the lighting socket. Moreover, male and female AC-power connectors 12 and 14 are axially aligned with one another along common axis A, as depicted in FIG. 1. Such alignment ensures that the lighting element is located along axis A, regardless of whether the lighting element is directly connected or indirectly connected, via light element adaptor 10, to the lighting socket. Even if lighting element adaptor 10 is interposed between the lighting element and its lighting socket, the lighting element will remain aligned with axis A, although the lighting element will reside further from the lighting socket. Thus, as long as space exists along axis A, lighting element adaptor 10 can be interposed between the lighting element and its lighting socket.

Lighting element adaptor 10 is configured to be modestly sized, so as to minimize the difference between locations where the lighting element resides when it is directly connected to a lighting socket and where the lighting element resides when indirectly connected to the lighting socket via lighting element adapter 10. To reduce this difference between such locations, lighting element adapter is configured with proximity between male and female AC-power connectors 12 and 14. Various metrics of such proximities can be used to characterize such location difference. For example, this difference in locations can be measured as a ratio between a first axially dimension as measured between a top of female AC-power connector 14 to a bottom center of female AC-power connector 14 (e.g., to the hot contact located at the bottom of female E-type connectors) and a second axial dimension as measured between the top of female AC-power connector 14 to a bottom center (e.g., to the hot contact located at the bottom of male E-type connectors) of male AC-power connector 12. This is a ratio of the axial dimension of the contacting elements of the lighting contact and the height of lighting element adaptor 10. Such a ratio can be greater than 25%, 33%, 40%, for example. In a limiting embodiment, such a ratio could nearly approach 50% as female AC-power connector 14 is located immediately adjacent (i.e., immediately above or below) male AC-power connector 12.

Another metric of such a location difference could be, for example, a ratio between a third dimension as measured between a top of the female AC-power connector 14 to a bottom of female AC-power connector 14 (i.e., the actual axial dimension of the contacting elements of the lighting contact) and a fourth dimension as measured between the bottom of female AC-power connector 14 to the bottom of male AC-power connector 12 (i.e., the actual lighting element displacement by lighting element adaptor 10). This is a ratio of the axial dimension of the contacting elements of the lighting contact and the actual lighting element displacement caused by interposing lighting element adaptor 10. Such a ratio can be greater than 50%, 67%, 75%, 90% for example. In a limiting embodiment, such a ratio could nearly approach 100% as female AC-power connector 14 is located immediately adjacent (i.e., immediately above or below) male AC-power connector 12.

In the depicted embodiment, male and female AC-power connectors 12 and 14 are E-type lighting connectors, such as, for example, E12, E17, and E26 sized lighting connectors. Female AC-power connector 14 is configured to receive a male E-type lighting connector, such as are commonly used for many types of lighting elements. Male AC-power connector 12 is configured to engage an E-type lighting socket so as to receive AC operating power therefrom. Such E-type lighting connectors provide power connector via threaded substantially-cylindrical male and female counterparts. Male AC-power connector 12 includes insulating region 22 providing electrical isolation between neutral contact 24 and hot contact 26. Hot contact 26 is located at a central end portion of male AC-power connector 12 along axis A. Hot contact 26 is located at a base of the substantially-cylindrical male AC-power connector 10. The sidewalls (e.g., substantially-cylindrical exterior surface) of male AC-power connecter are conductive and threaded. The conductivity of these sidewalls facilitates electrical connection with sidewalls (e.g., substantially-cylindrical interior surface) of a complementary female AC-power connector of a lighting socket. The threading of the sidewalls of male AC-power connector facilitates mechanical engagement with threading of the complementary female AC-power connector of a lighting socket. Although E-type lighting connectors are depicted in the FIG. 1 embodiment, various other types of complementary lighting connectors, as are used in the art, can be used for complementary AC-power connectors 12 and 14.

AC/DC power converter 16 is conductively coupled to male AC-power connector 12 so as to receive AC power therefrom. AC/DC power converter 16 is configured to generate DC power from the AC power received. Such DC power can then be provided to any of a variety of DC-powered devices that are often used in lighted venues, such as, for example, Bluetooth speakers. AC/DC power converter 16 can provide the DC power generated to a DC-powered device connected thereto via DC-power connector 22. In the depicted embodiment, DC power is selectively provided to DC-power connector 22 via DC-power switch 20. In other embodiments, the DC power generated is continually provided to DC-power connector 22, without selective interruption by a DC power switch.

FIGS. 2A-2D are perspective views of various embodiments of a light element adaptor. In FIGS. 2A-2D, lighting element adaptors **10*a*, 10*b*, and 10*c* are depicted. Each of lighting element adaptors 10*a*, 10*b* and 10*c* include male AC-power connector 12, female AC-power connector 14, AC/DC power converter 16 (enclosed within lighting element adaptors 10*a*-10*c*), and annular recess 28, which can be configured to engage with an attachment, such as, for example, a wire frame of a lamp shade and/or a Bluetooth speaker. Each of lighting element adapters 10*a*-10*c* differ from one another in the manner in which DC power is provided to DC-powered devices connected thereto. Lighting element adaptor 10*a* has DC-power connector 22*a*, which is a USB type of DC power connector. Lighting element adaptor 10*b* has DC-power connector 22*b*, which is located within annular recess 28 of lighting element adaptor 10*b*. Such a configuration can be used to provide DC power to an LED illuminated lampshade, for example. Lighting element 10*c* has DC-power connector 22*c*, which is located in or on a peripheral surface of body portion 30 surrounding female AC-power connector 14. Lighting element 10*c* also has AC power switch 18 and DC power switch 20 for enabling user selection of both AC power to female AC-power connector 14 and DC power to DC-power connector 22*c***.

In some embodiments, light element adaptors **10*a*, 10*b*, and/or 10*c* can include a wireless receiver for receiving commands that configure light element adaptor 10. For example, light element adaptors 10*a*, 10*b* and/or 10*c* can include such a wireless receiver for receiving commands, for example, that selectively provides the DC power generated to DC-power connectors 22*a*, 22*b*, and/or 22*c*. Similarly, in some embodiments the wireless receiver can be configured to receive commands, for example, that selectively provide to female AC-power connector 14 the AC power received by male AC-power connector 12**. The wireless receiver can be either one that receives signals using an industry standard protocol, or one that receives signals using a proprietary protocol. Such wirelessly communicated signals can be optical signals or electromagnetic waves of other frequencies. Some industry standard protocols include, for example, Bluetooth (e.g., Bluetooth Classic, Bluetooth Low Energy, Bluetooth 5.x, etc.) Wi-Fi (e.g., standards include 802.11a/b/g/n/ac/ax), RF, NFC, IR, Zigbee (e.g., standards include 802.15.4), Z-Wave, LoRa, etc.

In some embodiments, light element adaptors 10*a*, 10*b*, and/or 10*c* can include an adaptor controller for configuring the lighting element adaptor in response to commands received by the wireless receiver. The adaptor controller can be configured, for example, to selectively provide provides the DC power to the DC power connector in response to a command received by the wireless receiver commanding such selective provision of the DC power. In some embodiments, the adaptor controller can be configured to selectively provides the AC power received by the male AC-power connector to the female AC power connector in response to a command received by the wireless receiver commanding such selective provision of AC power.

Figure 2A:
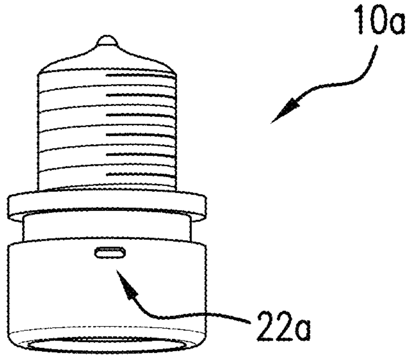
FIGS. 2A-2D are perspective views of various embodiments of a light element adaptor.
Figure 2B:
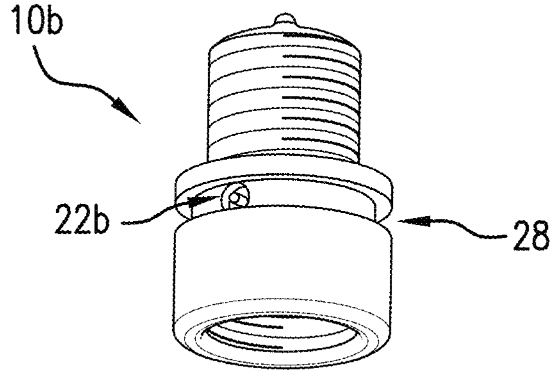
Figure 2C:
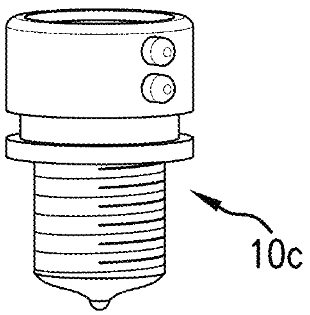
Figure 2D:
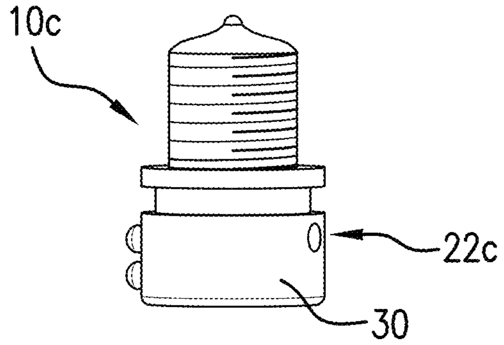
Figure 3A:
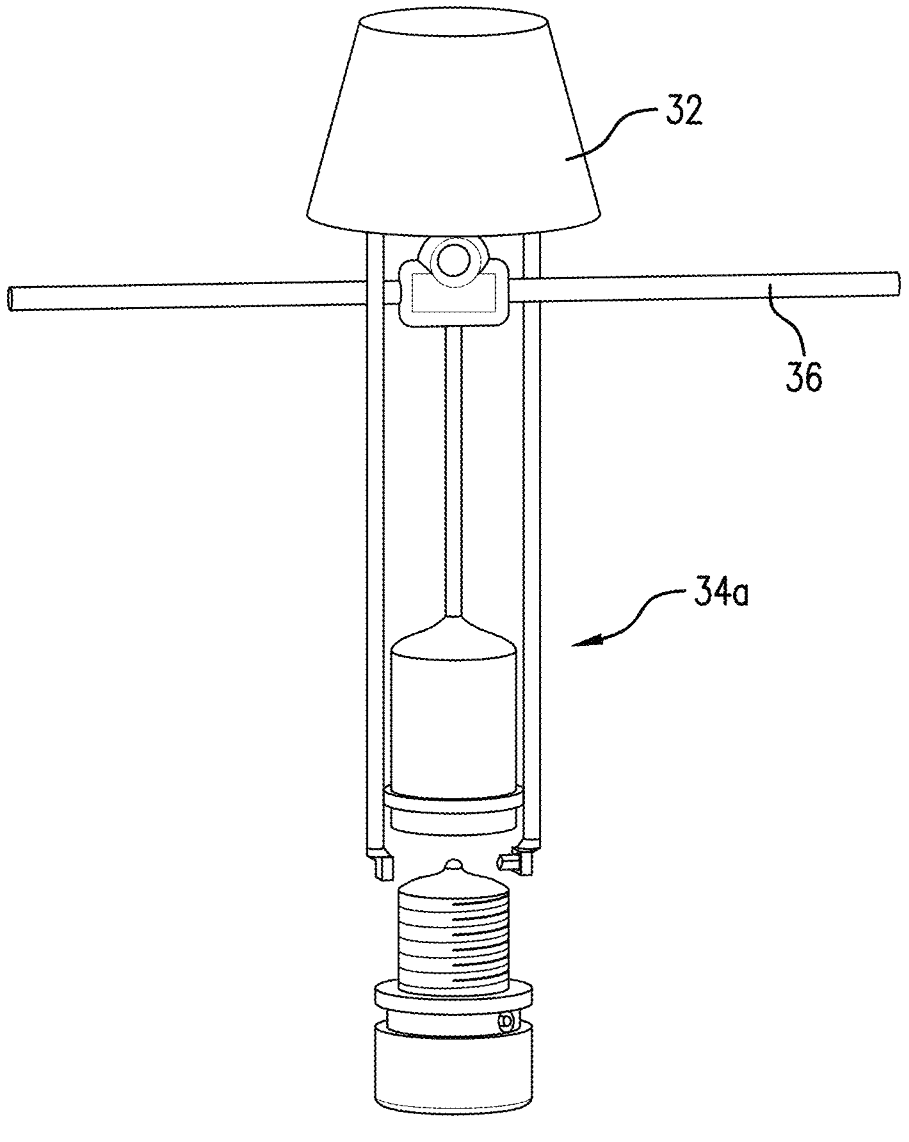
FIGS. 3A-3C are perspective views of a Bluetooth speaker configured to couple to the light element adapter shown in FIG. 2B.
Figure 3B:
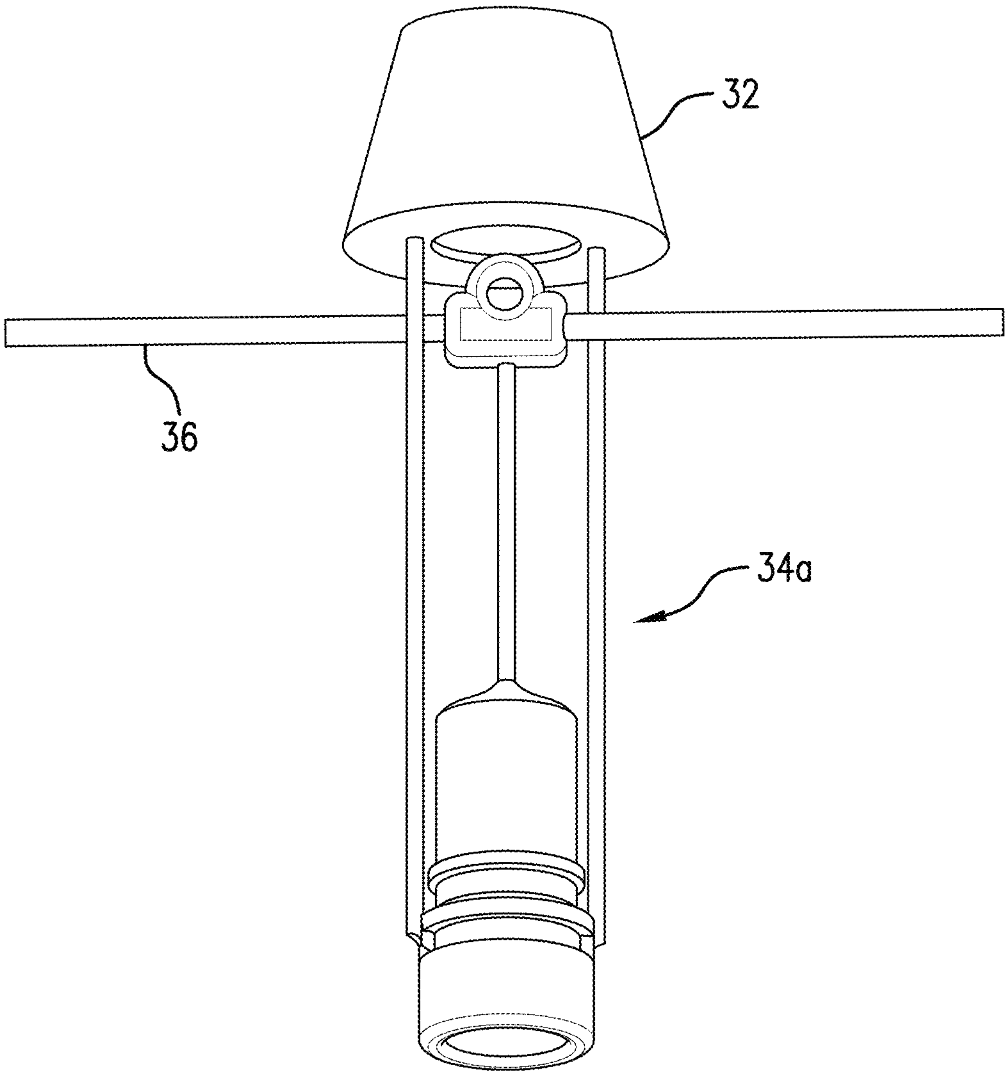
Figure 3C:
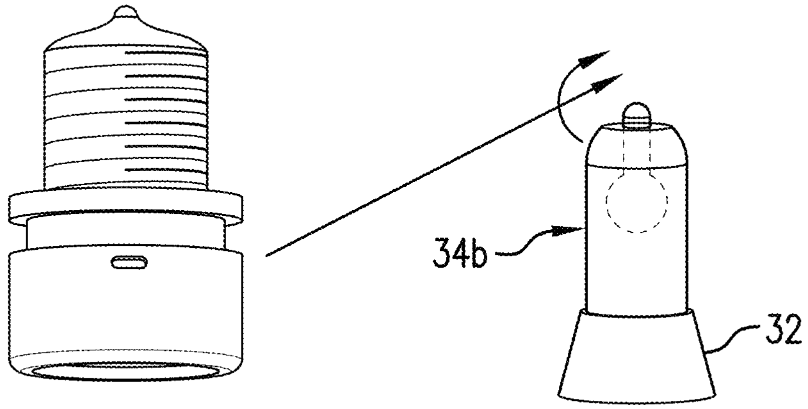

FIGS. 3A-3C are perspective views of a Bluetooth speaker configured to couple to the light element adapter shown in FIG. 2B. In FIGS. 3A-3C, Bluetooth speaker 32 is coupled to lighting element adaptor 10*b* via connecting mechanism (either connecting mechanism 34*a* or 34*b*). Connecting mechanisms 34*a* and 34*b* can be configured to provide both mechanical connection of Bluetooth speaker 32 to lighting element adaptor 10*b* and electrical connection of Bluetooth speaker 32 to DC-power connector 22 of lighting element adaptor 10*b*. In the depicted embodiment, lighting element adaptor 10*b* is coupled to café lighting string 36. In the embodiments depicted in FIGS. 3A and 3B, connecting mechanism 34*a* is configured to position Bluetooth speaker 32 above café light string 36, thereby not obscuring light emitted by a lighting element received within female AC-power connector 14 of lighting element adaptor 10*b*. In the embodiment depicted in FIG. 3C, connecting mechanism 34*b* is configured to position Bluetooth speaker 32 below café light string 36 thereby partially obscuring light emitted by a lighting element received within female AC-power connector 14 of lighting element adaptor 10*b*. In both embodiments, sound can be emitted in downward direction and/or in 360° radial directions about Bluetooth speaker 32. Such directions for emitting sound can be most efficacious for listeners who sit below café light string 36.

Figure 4:
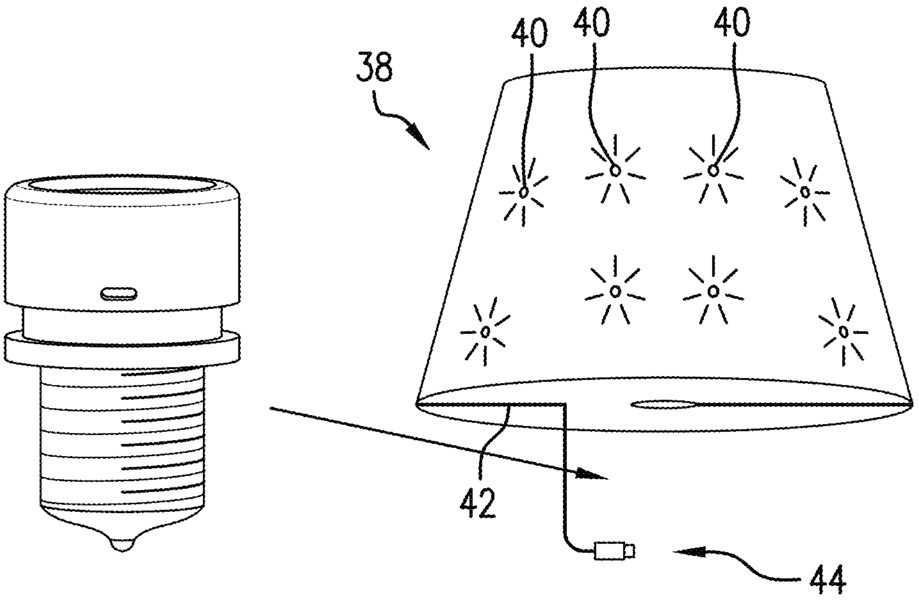
FIG. 4 is a perspective view of an LED-illuminated lamp shade configured to receive DC operating power from the light element adaptors shown in FIG. 2A.

FIG. 4 is a perspective view of an LED-illuminated lamp shade configured to receive DC operating power from the light element adaptors shown in FIG. 2A. In FIG. 4, illuminating lampshade 38 includes LEDs 40, wireframe 42, and power connector 44. LEDs 40 are affixed at various locations upon illuminated lampshade 38. LEDs 40 can be made to form various designs or in the various shapes of objects. Operating power for LEDs 40 is supplied by DC-power connector 22 of lighting element adaptor 10*a*, via power connector 44, which can be connected thereto. Wireframe 42 can be configured to mechanically couple with either a base of a lamp and/or with lighting element adaptor 10*a*.

Figure 5:
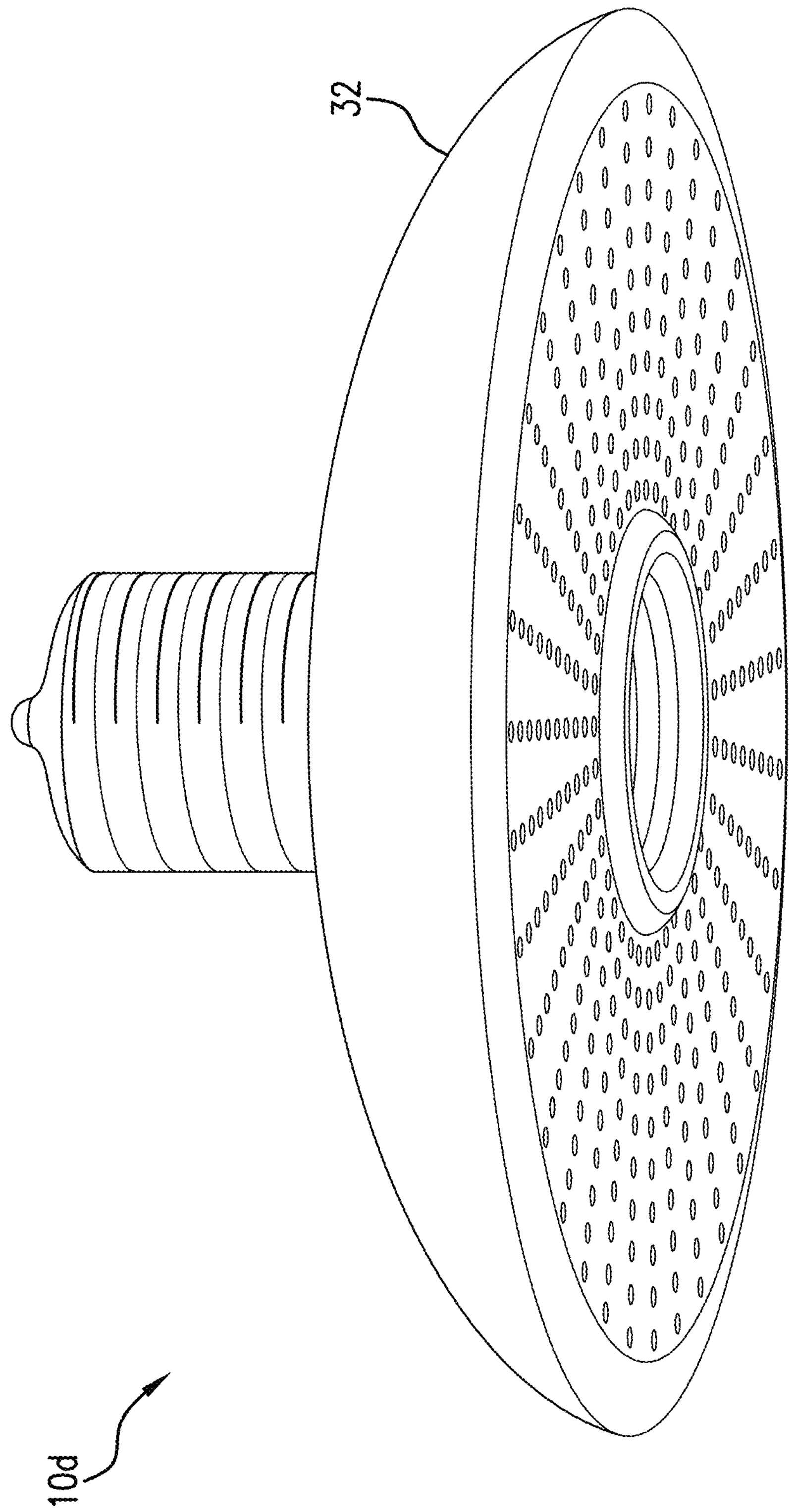
FIG. 5 is a perspective view of a Bluetooth speaker integrated with a lighting element adaptor.

FIG. 5 is a perspective view of a Bluetooth speaker integrated with a lighting element adaptor. In FIG. 5, integrated lighting element adaptor/speaker 10*d* is a unitary body that is configured to be interposed between a lighting element and a lighting socket while providing audio capabilities via Bluetooth speaker 32. Bluetooth speaker 32 is configured to receive DC operating power from an AC/DC-power converter located within lighting element adaptor/speaker 10*d*. Bluetooth speaker 32, as is known in the art, includes a Bluetooth receiver, which is configured to wirelessly receive Bluetooth signals transmitted by a Bluetooth transmitter. Bluetooth speaker 32 also includes an audio speaker, which is configured to generate sound based on the signal wirelessly received by the Bluetooth receiver. In some embodiments, Bluetooth speaker 32 is configured as a node of a mesh network. Bluetooth speaker 32 can be configured as a transceiver that can receive and transmit messages over the mesh network. Such a mesh network can be used to coordinate a plurality of speakers, for example. Such coordination can ensure that the plurality of speakers is synchronized so as to play the same music at the same time.

It will be recognized that the invention is not limited to the implementations so described but can be practiced with modification and alteration without departing from the scope of the appended claims. For example, the above implementations may include specific combinations of features. However, the above implementations are not limited in this regard, and, in various implementations, the above implementations may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A lighting element adaptor comprising:

complementary male and female AC-power connectors axially aligned with one another so as to be interposed between a lighting element and a lighting socket, the male AC-power connector configured to engage a lighting socket so as to receive AC power therefrom, the female AC-power connector conductively coupled with the male AC-power connector so as to receive AC power therefrom, the female AC-power connector configured to receive a lighting element and to provide the AC power received from the male AC-power connector thereto;

an AC/DC power converter configured to generate DC power from the AC power received by the male AC-power connector and to provide the DC power generated to a DC-powered device coupled thereto;

an AC switch that selectively provides the AC power received by the male AC-power connector to the female AC-power connector; and a DC switch that selectively provides the DC power to the DC-power connector.

2. The lighting element adaptor of claim 1, further comprising:

a DC-power connector configured to provide the DC power generated by the AC/DC converter to the DC-powered device removably connected thereto via a complementary DC-power connector.

3. The lighting element adaptor of claim 2, wherein the DC-power connector is on a peripheral surface of the lighting element adapter between the complementary male and female connectors.

4. The lighting element adaptor of claim 1, wherein each of the male and female connectors are E-type threaded lighting connectors, the male AC-power connector having a hot contact at an end of a substantially cylindrical contacting base and a threaded neutral contact about an exterior surface of the substantially cylindrical contacting base, the female AC-power connector having a hot contact as a bottom center of a substantially cylindrical receiving socket and a threaded neutral contact about an interior surface of the substantially cylindrical receiving socket.

5. The lighting element adaptor of claim 4, wherein the complementary male and female AC-power connectors are E26-sized or E27-sized E-type threaded lighting connectors.

6. The lighting element adaptor of claim 1, wherein a ratio between a first axial dimension as measured between a top of the female AC-power connector to a bottom center of the female AC-power connector and a second axial dimension as measured between the top of the female AC-power connector to a bottom of the male AC-power connector exceeds 33%.

7. The lighting element adaptor of claim 1, wherein a ratio between a third dimension as measured between a top of the female AC-power connector to a bottom of the female AC-power connector and a fourth dimension as measured between the bottom of the female AC-power connector to a bottom of male AC-power connector exceeds 75%.

8. The lighting element adaptor of claim 1, further comprising: a Bluetooth speaker configured to receive the DC power from the AC/DC-power converter.

9. The lighting element adaptor of claim 8, wherein the Bluetooth speaker includes:

a Bluetooth receiver configured to wirelessly receive Bluetooth signals transmitted by a Bluetooth transmitter; and a speaker configured to generate sound based on the signal wirelessly received by the Bluetooth receiver.

10. The lighting element adaptor of claim 8, wherein the Bluetooth speaker is oriented to direct sound about the female AC-power connector.

11. The lighting element adaptor of claim 1, wherein the DC-power connector is a USB power connector configured to provide power to the DC-powered device which is connected thereto.

12. The lighting element adaptor of claim 1, further comprising:

a wireless receiver configured to wirelessly receive commands that configure the lighting element adaptor.

13. The lighting element adaptor of claim 12, wherein the wireless receiver is configured to wirelessly receive optical signals.

14. The lighting element adaptor of claim 12, wherein the wireless receiver is configured to wirelessly receive electromagnetic wave signals.

15. The lighting element adaptor of claim 14, wherein the wireless receiver is configured to wirelessly receive signals according to a Bluetooth protocol.

16. The lighting element adaptor of claim 14, wherein the wireless receiver is configured to wirelessly receive signals according to a Wi-Fi protocol.

17. The lighting element adaptor of claim 12, further comprising:

an adaptor controller for configuring the lighting element adaptor in response to commands received by the wireless receiver.

18. The lighting element adaptor of claim 17, wherein the adaptor controller is configured to selectively provide the DC power to the DC-power connector in response to a command received by the wireless receiver commanding such selective provision of the DC power.

19. The lighting element adaptor of claim 17, wherein the adaptor controller is configured to selectively provide the AC power received by the male AC-power connector to the female AC-power connector in response to a command received by the wireless receiver commanding such selective provision of AC power.

* * * * *